P. RICE.
SLEIGH RUNNER ATTACHMENT FOR WAGONS.
APPLICATION FILED JULY 5, 1916.
1,218,467.
Patented Mar. 6, 1917.
2 SHEETS—SHEET 1.
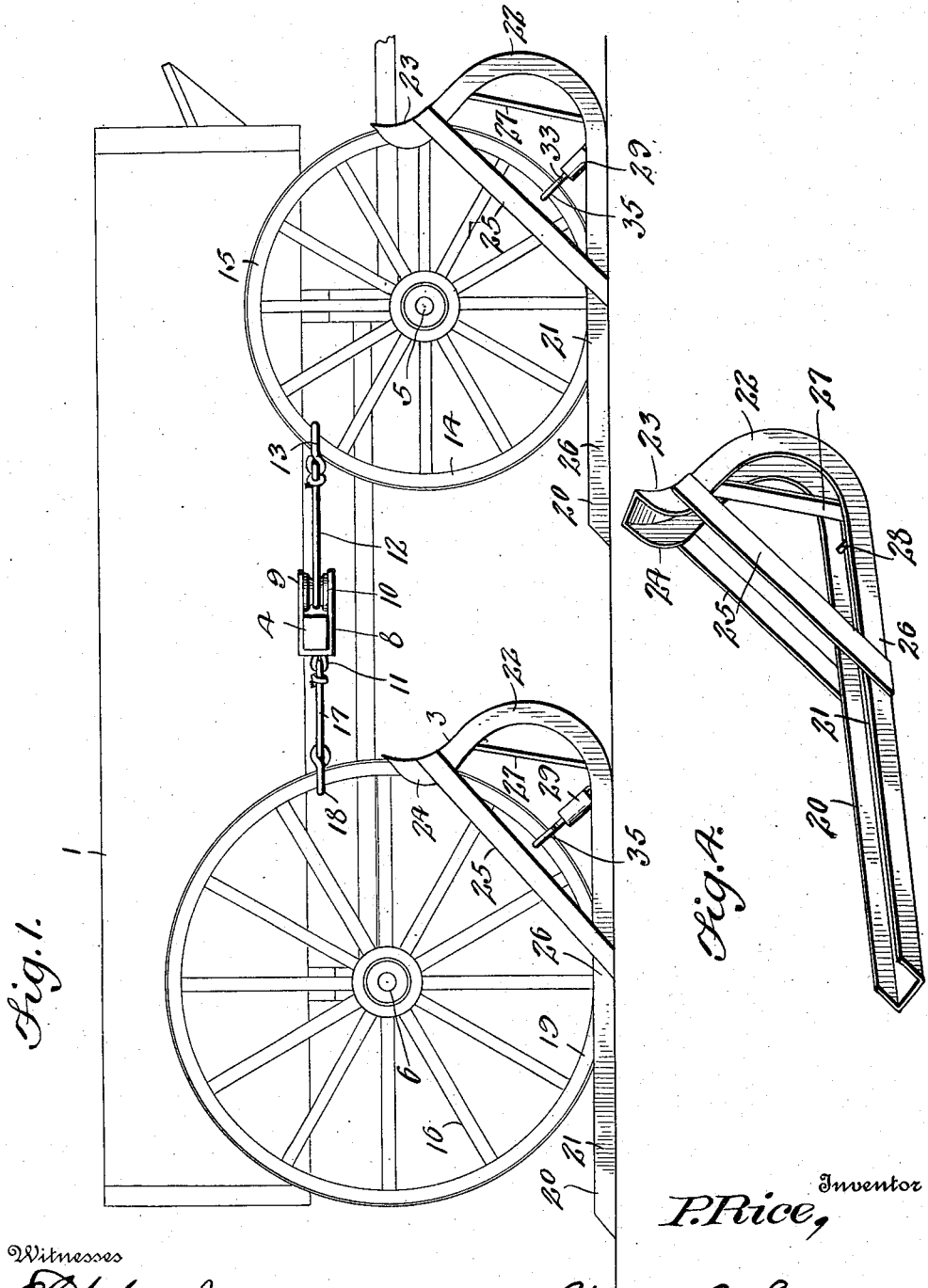

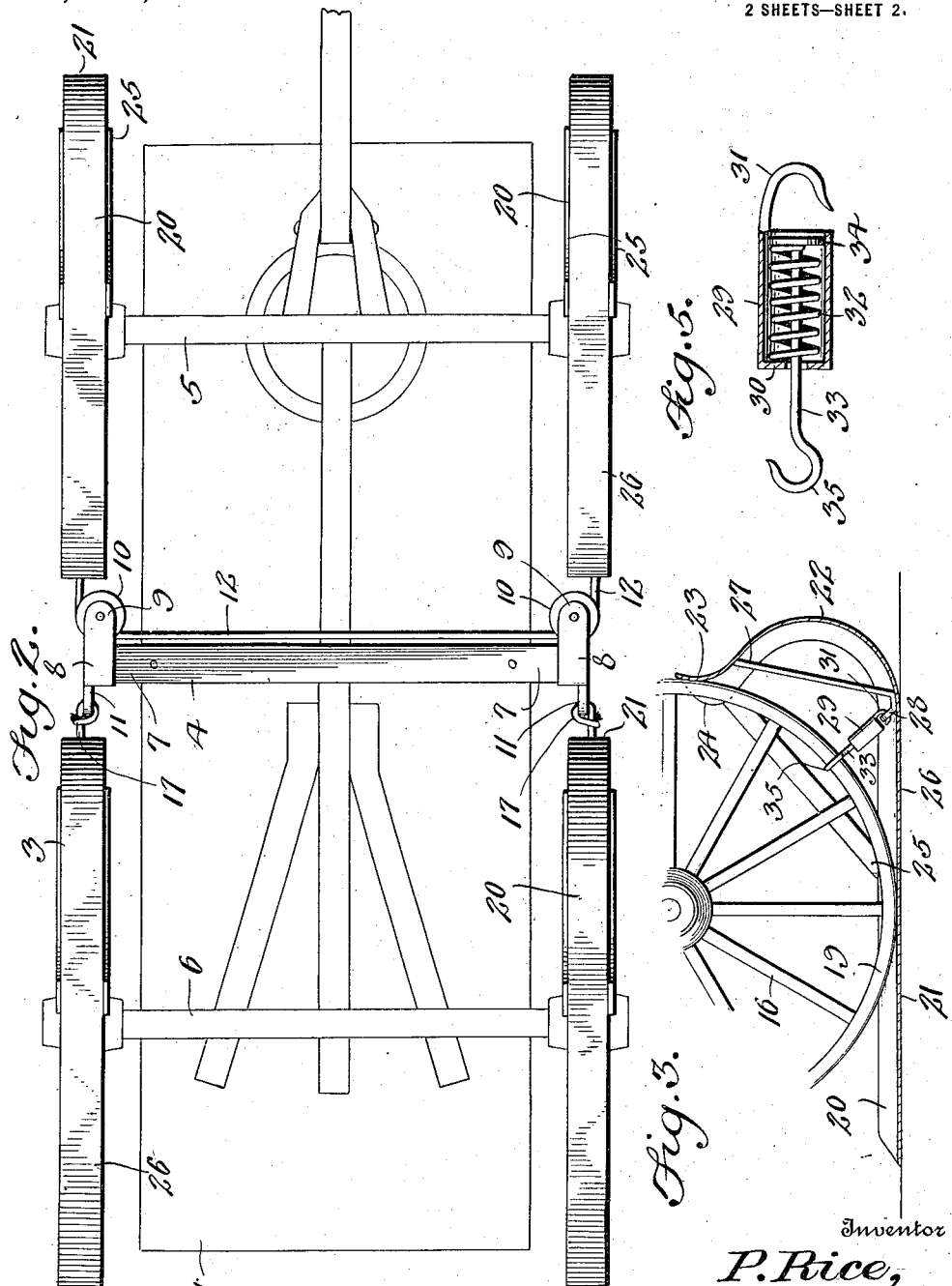

UNITED STATES PATENT OFFICE.

PERCY RICE, OF WILSALL, MONTANA.

SLEIGH-RUNNER ATTACHMENT FOR WAGONS.

1,218,467.	Specification of Letters Patent.	Patented Mar. 6, 1917.

Application filed July 5, 1916. Serial No. 107,626.

*To all whom it may concern:*

Be it known that I, PERCY RICE, a citizen of the United States, residing at Wilsall, in the county of Park and State of Montana, have invented new and useful Improvements in Sleigh-Runner Attachments for Wagons, of which the following is a specification.

This invention relates to a sleigh runner attachment which is especially adapted for connection with vehicles to enable the same to be used as a sleigh.

The primary object of the invention is to provide an attachment of this character including runners which are so constructed that the vehicle to which the runners are to be applied may be driven thereon and the runners connected with the vehicle quickly and in a satisfactory manner.

Another object of the invention is to provide a sleigh runner attachment for vehicles in which the runners for connection with the wheels of the vehicle are provided with braces so arranged that when the runners are connected with the wheels, the braces not only support the curved end of the runner, but also prevent lateral movement of the wheels of the vehicle within the runners.

A further object of the invention is to provide a sleigh runner attachment having a bar for connection with the vehicle and provided with flexible elements for connection with the wheels of the vehicle to limit the turning of the wheels upon the axles of the vehicle when the runners on the wheels come in contact with an obstruction, although the front axle may be turned in the usual manner.

With these and other objects in view, the invention resides in the novel combination and arrangement of parts, which will be hereinafter described and particularly pointed out in the claims.

The preferred embodiment of the invention has been illustrated in the accompanying drawing, although no restriction is necessarily made to the precise details of construction therein shown, as changes, alterations, and modifications, within the scope of the claims may be resorted to when desired.

Like characters of reference denote corresponding parts throughout the several views, in the drawing, in which:

Figure 1 is a side elevation of a wagon showing the improved sleigh runner attachment applied thereto.

Fig. 2 is a bottom plan view of the wagon.

Fig. 3 is an enlarged longitudinal sectional view through one of the runners included in the attachment and showing the same connected with a portion of a wheel.

Fig. 4 is a perspective view of one of the runners included in the attachment and showing the same removed from a wheel.

Fig. 5 is a longitudinal sectional view upon an enlarged scale through the connection between the runners and the vehicle wheel.

Referring now to the drawings in detail, the numeral 1 designates a wagon of the type commonly employed upon farms, and the like, and to which the improved sleigh runner attachment designated by the numeral 3 is shown applied.

A bar 4 extends transversely of the wagon bed between the front axle 5 and the rear axle 6 and is secured to the wagon bed in any suitable manner with the ends 7 of the bar extending beyond the sides of the wagon bed.

Each extending end 7 of the bar 4 has detachably connected therewith a clip 8 provided with spaced arms 9 extending beyond one side of the bar and receiving therebetween a roller 10, the other end of each clip 8 having formed thereon an eye 11.

A flexible element 12 which in this instance has been shown as a cable is arranged between the rollers 10 and the bar 4 with each terminal of the flexible element provided with a clamp 13 so constructed that the ends of the flexible element may be easily and quickly connected with the fellies 14 of the front wheels 15 to prevent the front wheels turning upon the front axle 5 when the attachment is in use yet allowing the front axle to be turned in the usual manner.

In order that the rear wheels 16 of the vehicle may be held against turning movement upon the axle 6 each eye 11 has connected therewith one end of a short flexible element 17, the other end of which is provided with a clamp 18 similar in construction to the clamps 13 and adapted to engage the felly 19 on a rear wheel 16.

Runners 20 for connection with the wheels 15 and 16 are provided with each runner being identical in construction and comprising a bar 21, channeled longitudinally throughout its length, with a portion of the bar near one end thereof curved toward the other end of the bar as at 22, said curved portion 22 terminating in a reversely curved end 23 forming a stop shoulder with each end having resilient clamping fingers 24 adapted to receive therebetween a portion of the felly of the wheel with which the runner is to be connected.

Extending rearwardly from the curved portion 22 of the runner and upon opposite sides of the same are braces 25 the other ends of which are connected with the straight portion 26 of the runner between its ends, said braces serving to materially strengthen the curved portion 22 of the runner and also prevent lateral movement of the vehicle wheel within the channel of the runner when the runner is connected therewith.

A brace bar 27 has one end connected with the curved portion 22 of the runner below and adjacent to the end 23 which serves as a stop shoulder with the other end of the brace bar connected with the sides of the straight portion 26 of the runner, said last mentioned end having formed thereon an eye 28.

A sleeve 29 is provided at one end with a flange 30 and at its other end with a hook 31 having the bill thereof received in the eye 28, said sleeve receiving therein a coiled expansion spring 32 of less length than the sleeve and having an end bearing against the flange 30.

A rod 33 passes through the flanged end of the sleeve 29 and through the spring 32 and is provided upon one end with a head 34 for contact with the other end of the spring 32.

The other end of the rod 33 has formed thereon a hook 35 for connection with the felly of the wheel on the vehicle to secure the runner thereto.

Through the above described arrangement of the rods and springs within the sleeves, it will be seen that the runner is provided with a clamp for connecting the same with the vehicle wheel which will enable the runner to be connected with vehicle wheels which vary in size and, therefore, advantageously used in connection with vehicles of different makes and types.

When it is desired to apply the sleigh runner attachment to a wagon, the runners are arranged in advance of the wheels with the straight portion of the runners resting upon the ground.

The wagon is now pushed or pulled forwardly upon the runners until the wheels contact with the ends 22 of the runners which serve as stop shoulders at which time the fingers 24 will grip the fellies and prevent the displacement of the runner should the wagon accidentally move backwardly.

With the wheels in the above described position upon the runners, it will be seen that the braces 25 serve to prevent lateral movement of the wheels within the channels in the runners.

The rods 33 may now be drawn through the sleeve 29 until the hooks on the ends of the rod can be engaged with the felly on the wheel thus effectually clamping the runners to the wheels and in such a manner that the runners may be easily and quickly disconnected therefrom when the occasion requires.

The clamps on the flexible elements 12 and 17 are connected with the fellies on the front and rear wheels, so that should the runners strike an obstruction, the wheels could have slight turning movement on the axles although the wheels would be prevented from turning sufficiently far to allow the runners to dig into the ground and be broken from the wheels.

From the foregoing description, taken in connection with the accompanying drawings, it will at once be apparent that a sleigh runner attachment for wagons has been provided which is so constructed that it may be easily and quickly connected with or detached from a wagon to enable the same to be used as a sleigh and that the attachment comprises few parts and is therefore simple in construction and inexpensive of manufacture.

Having thus described the invention, what is claimed as new, is:

1. In a sleigh runner attachment for wagons, the combination with a wagon, of a bar connected with the wagon body, runners for connection with the wheels of the wagon, means for connecting the runners with the wheels, and a connection between the wagon wheels and bar.

2. In a sleigh runner attachment for wagons, the combination with a wagon, of a bar connected with the wagon body, a flexible connection between the wagon wheels and bar, runners for connection with the wagon wheels, and clamps on the runners for connection with the fellies on the wagon wheels.

3. In a sleigh runner attachment for wagons, the combination with a wagon, runners for connection with the wheels of the wagon, means for connecting the runners with the wheels, a bar connected with the wagon body, flexible elements carried by said bar, and clamps on the ends of the flexible elements for connection with the fellies on the wagon wheels.

4. In a sleigh runner attachment for wagons, the combination with a wagon, of runners, means for connecting the runners with the wheels of the wagon, a bar connected with the bottom of the wagon bed, clamps detachably connected with said bar, flexible elements connected with the clamps, and means for connecting the ends of the flexible elements with the fellies of the wagon wheels.

5. In a sleigh runner attachment for wagons, the combination with a wagon, of a connection between the wagon body and the wagon wheels, runners having curved portions terminating in ends for contact with the rims of the wheels, gripping fingers on said ends, clamps connected with the runners and having spring pressed hooks engageable with the fellies of the wagon wheels.

6. In a sleigh runner attachment for wagons, the combination with a wagon, of a flexible connection between the wagon body and wagon wheels, runners being curved for a portion of their length and terminating in stop shoulders, brace bars extending transversely between the stop shoulders and body of the runner, sleeves connected with said braces, and spring controlled hooks carried by the sleeves, and engageable with the fellies of the wagon wheels.

In testimony whereof I affix my signature.

PERCY RICE.

Copies of this patent may be obtained for five cents each, by addressing the "Commissioner of Patents, Washington, D. C."